3 Sheets—Sheet 1.
F. G. WHEELER.
METHODS OF, AND APPARATUS FOR TREATING COTTON, &c.
No. 193,203. Patented July 17, 1877.
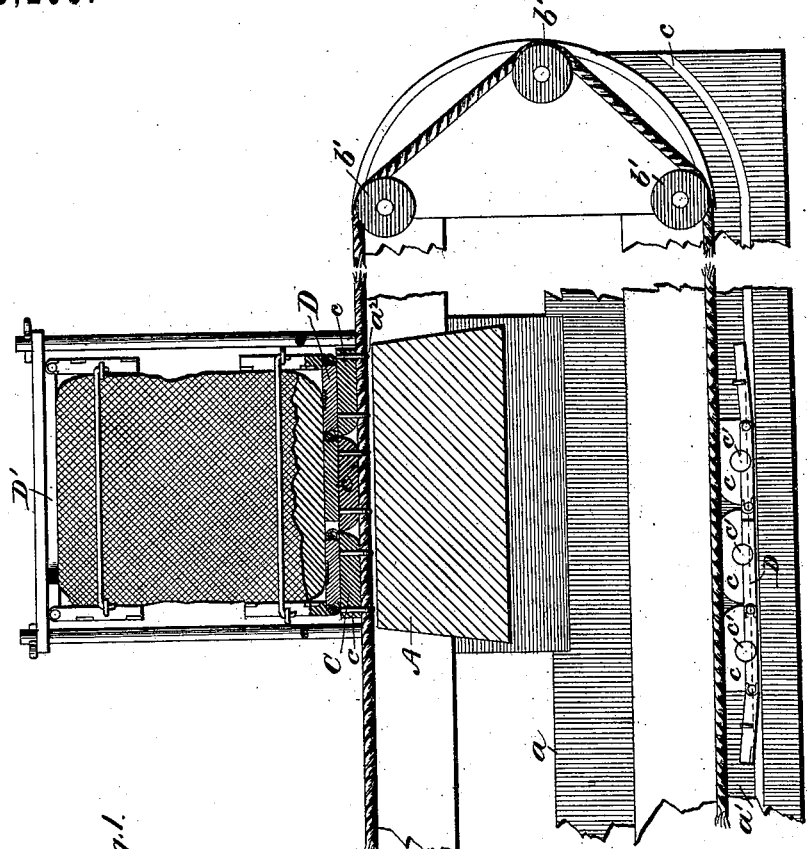
Fig. 1.
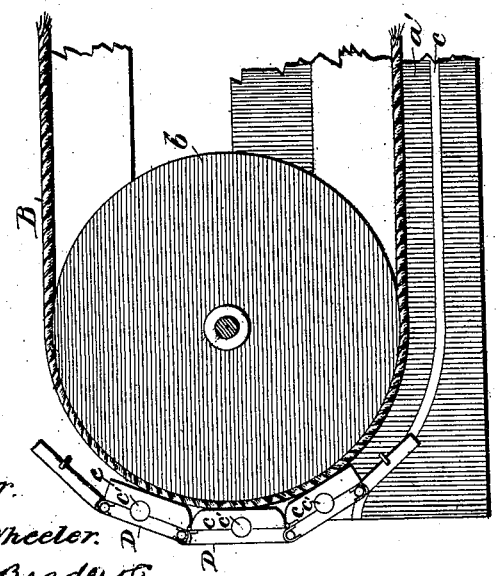
Witnesses;
Harry C. Clark
Mamie Stallings
Inventor.
F. G. Wheeler.
by A. W. Beader
Attys.

F. G. WHEELER.
METHODS OF, AND APPARATUS FOR TREATING COTTON, &c.
No. 193,203. Patented July 17, 1877.
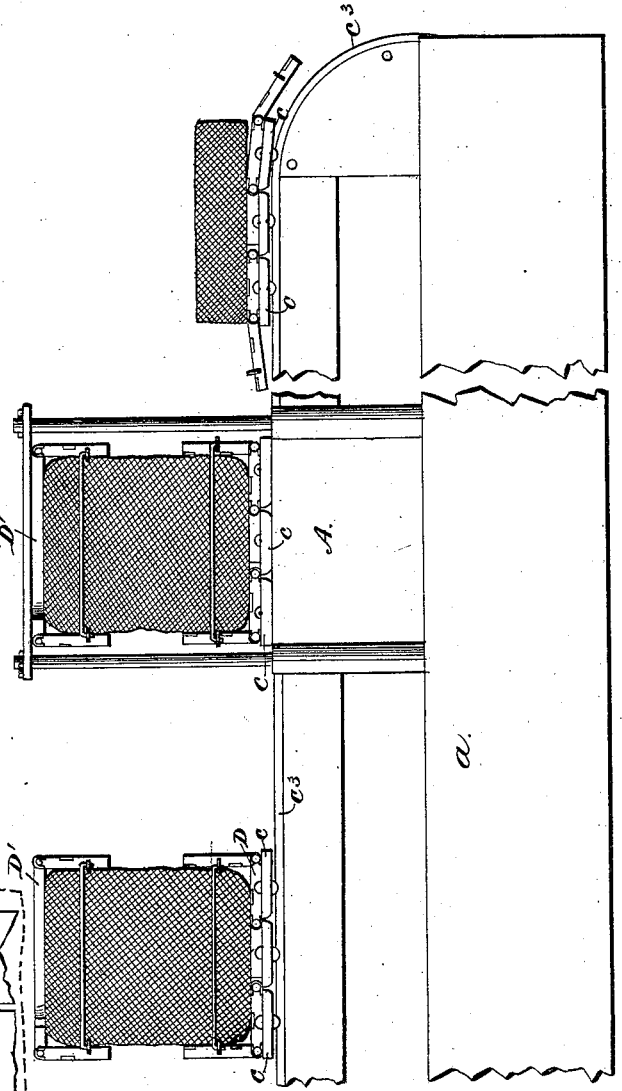
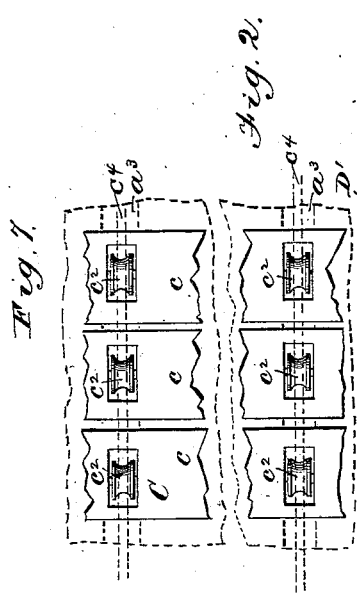
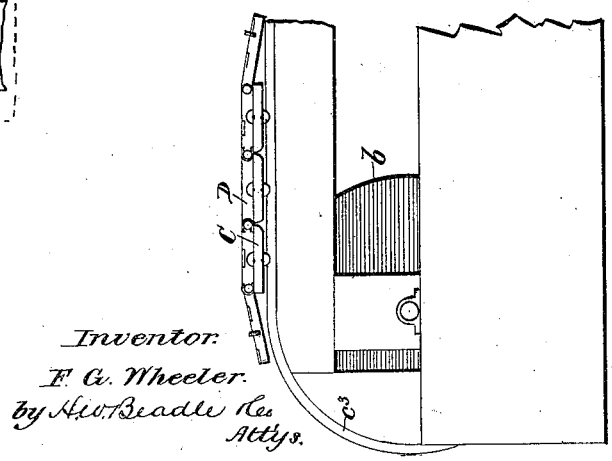
Witnesses:
Harry C. Clark
Noames Stallings
Inventor:
F. G. Wheeler.
by H. W. Beadle & Co.
Attys.

3 Sheets—Sheet 3.
F. G. WHEELER.
METHODS OF, AND APPARATUS FOR TREATING COTTON, &c.
No. 193,203. Patented July 17, 1877.
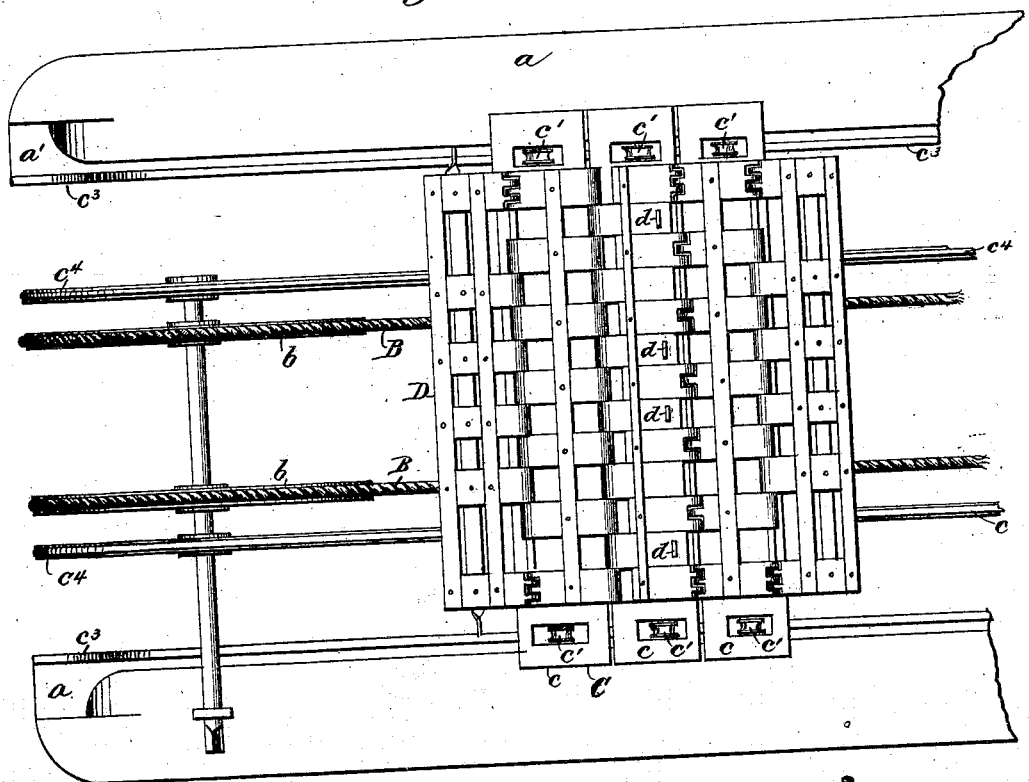
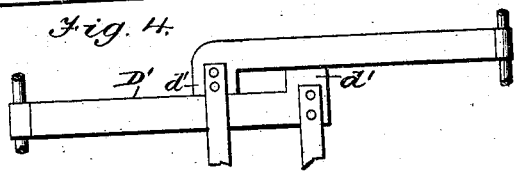
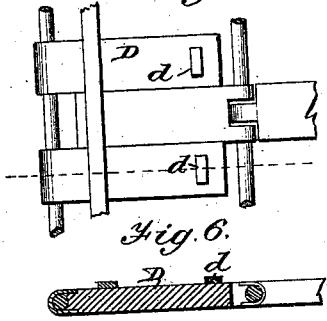
Witnesses:
Harry C. Clark
Mamie C. Stallings
Inventor:
F. G. Wheeler
by H. W. Beadle
Attys.

UNITED STATES PATENT OFFICE.

FREDERICK G. WHEELER, OF NEW YORK, N. Y.

IMPROVEMENT IN METHODS OF AND APPARATUS FOR TREATING COTTON, &c.

Specification forming part of Letters Patent No. 193,203, dated July 17, 1877; application filed December 6, 1876.

*To all whom it may concern:*

Be it known that I, F. G. WHEELER, of New York, in the county of New York and State of New York, have invented a new and Improved Method of and Apparatus for Treating Cotton and other Bales before, under, and after compression; and I do hereby declare that the following is a full and exact description of the same, reference being had to the accompanying drawings, and to the letters of reference marked thereon.

This invention consists, mainly, first, in an improved method of automatically delivering cotton or other bales to the press for compression and removing them therefrom after compression, consisting essentially in placing the bales to be compressed successively at proper intervals upon an intermittently-moving surface passing through the press; and, second, in the peculiar apparatus employed to carry the method practically into effect, consisting, essentially, of an endless chain or platform traveling with an intermittent movement, which is adapted to deliver bales properly placed upon it to the press for compression and to remove them from it after compression.

In the drawings, Figures 1 and 2 represent side elevations of my improved apparatus, the first figure being partially in section; Fig. 3, a plan view of the traveling platform and the lower frame; Figs. 4, 5, and 6, partial views representing the stop mechanism of the frames, and Fig. 7 a plan view of the traveling platform reversed.

To enable others skilled in the art to make and use my invention, I will now proceed to describe fully its construction and manner of operation.

A represents the lower platen of a cotton-press of proper construction, which is supported by any proper base, $a$, having proper space $a^1$ below for the passage of the endless chains or ropes and their attachments. $a^2$ represents one or more transverse grooves or recesses in the platen for the passage of the chain or chains, and $a^3$ $a^3$, Fig. 7, guiding-grooves for the wheels of the traveling frame hereinafter referred to. B represents one or more endless chains or equivalent devices of any proper construction, which are adapted to receive movement from the wheel or wheels $b$ driven by the main power in any suitable manner. $b'$ $b'$ represent pulleys of any proper kind, which are located at the proper points to suitably guide the chain. C represents a platform consisting of a suitable number of sections, $c$ $c$ $c$, hinged together longitudinally, which is properly attached to the endless chain so as to be moved by it. $c^1$ $c^1$ $c^2$ $c^2$, Figs. 3 and 7, represent rollers, by means of which the platform is properly guided in its movement, and the friction of its movement reduced. $c^3$ $c^3$ $c^4$ $c^4$ represent guideways of any proper construction, which furnish bearings for the rollers $c^1$ $c^1$ $c^2$·$c^2$, as shown. D represents an independent frame made in two distinct parts, which are adapted to be drawn apart or forced together for the purpose of adjusting the frame as a whole to accommodate bales of varying width. The base or bottom portion of each part is divided into longitudinally-hinged sections for the purpose of adapting it to accommodate itself to the movements of the sectional carrier to which it is attached. $d$ $d$, Figs. 3, 5 and 6, represent stop-blocks, by means of which the movement of the adjusting portion is so limited that the parts cannot be entirely separated. In other respects the frame is substantially the same in construction as that described in my patent of September 19, 1876, No. 182,339. D' also represents an independent frame such as is described in my patent before referred to, with the exception of the stop-checks $d'$, Fig. 4, which frame is employed to cover the upper surface of the bale, as will be hereinafter described.

From the foregoing description my improved method and the apparatus for carrying it into effect will be readily understood. The bales to be compressed, either prepared as described in my patent before referred to, or without previous preparation, are successively placed at proper distances apart in a continuous series upon the carrier-surface and automatically conveyed to the press. Here each is compressed in the usual manner, (the movement of the carrier being arrested for that purpose,) and is then delivered out of the press to any desired point by the further movement of the carrier.

With my improved frames the operation would be substantially as follows: Upon each member of the series of frames attached to the moving carrier the lower bands are first properly laid, (an upper and lower set of bands being employed,) and upon them a bale, which is accurately adjusted, so that it will be squarely acted on in the press. The top bands are then laid upon the bale and covered by another frame. The side pieces of these frames are then turned into position and locked, so that the bale is ready for the action of the press before it reaches it, and hence no time is lost in squaring it, or in applying the bands when it reaches that point.

The advantages resulting from the use of my invention will be readily understood. The bales may be carefully and completely prepared for the press at a distance therefrom, where space is not as valuable, and then be quickly conveyed to the press without the disarrangement of any part, the bale itself being automatically placed in the press in the best position to properly receive its action. By this means all the time usually lost in the press and in applying its bands, during which the movement of the press is retarded and its operation suspended, is saved, thus securing the compression of bales with greater rapidity, better work also being performed, because more time is afforded for the proper preparation of the bale.

Having thus fully described my invention, what I claim as new, and desire to secure by Letters Patent, is—

1. The described method of treating cotton-bales, consisting, essentially, in placing the pressed bales successively in a continuous series upon an intermittently-moving surface, and in conveying them into the press for compression, and conveying them out of the press, after compression, to the point of discharge, substantially as described.

2. In combination with a cotton-press, an intermittently-moving carrier, adapted, substantially as described, to receive and discharge a continuous series of bales.

3. In combination with a cotton-press, the endless chain or chains, having the sectional platform, substantially as described.

4. In combination with the endless chain and platform, the sectional frame D, as described.

5. In combination with the described method of treating cotton-bales before and during compression, consisting in applying the bands to the bale before it enters the press, and holding them before and during the time of compression by independent frames, the method of automatically conveying them to the press, substantially as described.

This specification signed and witnessed this 28th day of November, 1876.

FREDERICK G. WHEELER.

Witnesses:
CHARLES NETTLETON,
CHAS. E. MILLS.